Feb. 18, 1969 J. R. SUMMERS 3,428,409
RIGID WICK, RIGID CORE-WICK AND RIGIDIZED CANDLE
Filed Sept. 6, 1966 Sheet 1 of 3

INVENTOR.
JAMES R. SUMMERS
BY
ATTORNEYS

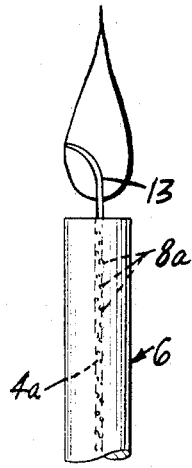
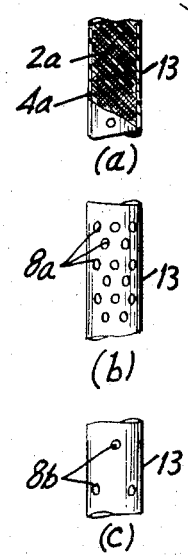
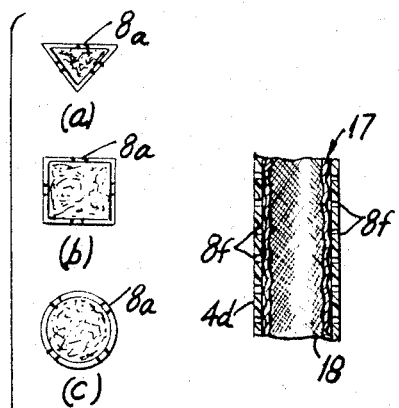
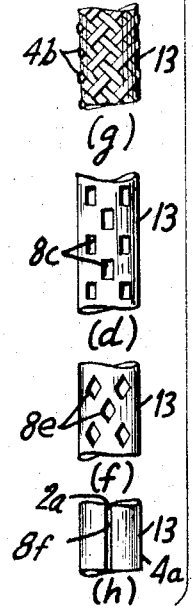
INVENTOR.
JAMES R. SUMMERS

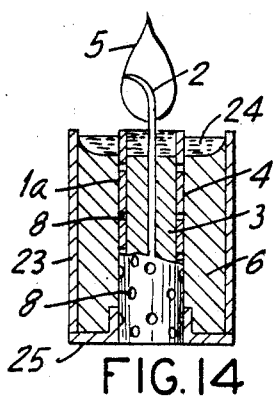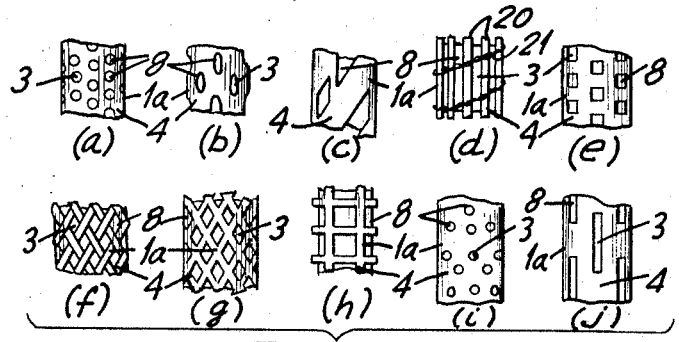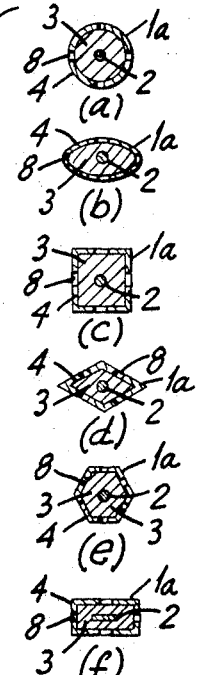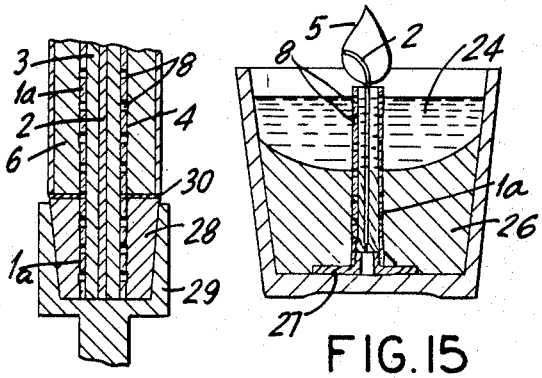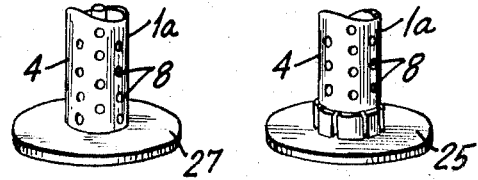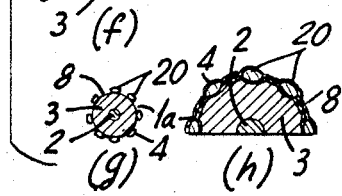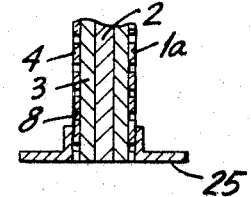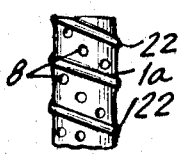

3,428,409
RIGID WICK, RIGID CORE-WICK AND RIGIDIZED CANDLE
James R. Summers, 353 E. 50th St., New York, N.Y. 10021
Continuation-in-part of application Ser. No. 406,037, Oct. 23, 1964. This application Sept. 6, 1966, Ser. No. 577,268
U.S. Cl. 431—289     25 Claims
Int. Cl. F23d *3/16, 3/24;* C11c *5/00*

ABSTRACT OF THE DISCLOSURE

The present invention provides a rigid support for use in a candle generally including a wick and a surrounding outer portion of independently flammable, wax resistive structure, the flame on the wick igniting the outer portion to combustion.

---

The present invention relates to an improved rigid wick and candle wick, a continuation-in-part of my co-pending application, Ser. No. 406,037 filed Oct. 23, 1964, now abandoned.

In my United States application, Ser. No. 389,397 filed Aug. 13, 1964, now abandoned, for a rigid wick and rigid candle, I described various types of rigid wicks and cores and stem wicks. In that application, the stiffening for the candle core or wick was a centrally located rigidizing factor.

The advantages and need for rigidizing candles have long been known and many candles of the past have been made rigid by various means.

With regard to the present invention, rigidity refers to the provision of a combustible or consumable layer of substance having a higher melting point or combustion temperature than that of the melting point of normal candle wax, said layer disposed about a taper or taper-like core, integral to a candle.

The combination of the flame consumable layer serves as a spine protecting the candle or taper from the problems of wilting under ambient atmospheric heat or wilting or sagging during burning.

The taper as a burning unit itself or as a core in a candle has a stamina adapting it for not only the internal support of a candle where desired, but as a support for other articles by the taper or even as a mounting support for the candle itself.

The rigidity of the taper and candle of the present invention is distinguished from the rigidity found in candles of the past where hard waxes or wick impregnations have given greater strength to conventional candles. While in the past, some rigidity of candle has been provided by some forms of impregnation of fibre or interweaving of metal, the general effect of candles and wicks of the past had been to provide a stiffener or resilient wick, not providing strength to a candle or taper and not providing for generally clean and even burning and extra strength against physical stress or heat which usually wreak havoc with candles of the past.

The rigidity of wicks of the past has usually been a stiffening enabling such wicks to stand erect, if supported, without providing any appreciable strength to the candle itself.

Wicks of the past have usually been resilient rather than rigid and have not had an independent rigidity to permit, for instance, the support of other objects placed over a wick.

Prior devices have also usually failed to provide for generally full and clean consumption by the flame or have tended to leave unconsumed residues which clog the normal capillarity of the wick burning portion.

Of interest and quite separate and apart from the present invention are rigid candles such as sealing wax candles. These candles by their coatings and emplacement inside a rigid sealing wax periphery are actually rigid. While they may be called candles, they are not in fact illuminating instrumentalites.

United States Patent No. 1,462,601 to Hohmann is typical of such candles. The burning of such device, even with the protective layer between the actual candle and sealing wax could not serve as a normal illuminating candle. Further, Hohmann, if burnable erect, would either melt away the outer layer of sealing wax to drip down its side or flood over the protective layer and allow the sealing wax to suffocate the wick and extinguish the flame. Any layer of sealing wax in a Hohmann sealing wax candle sufficiently thin to be melted away from the candle by the flame of the wax part of the candle, while it might sustain erect burning of the Hohmann sealing wax candle, would defeat the normal function of a candle and cause a segregation of sealing wax from the internal candle, leaving a mess of sealing wax incompatible with the requisites of illuminating candles and incompatible with the almost total candle fuel consumption of the present invention. Failure of melting away of the Hohmann sealing wax would either bury the flame in the middle of the Hohmann candle, probably extinguishing it, or smother the flame by an inward flow of sealing wax. No such problems exist with regard to the present invention.

Hard waxes of the past, in coatings or just candle fuel, have strengthened candles and even "rigidized" them, yet such waxes have not protected candles against ambient weather heat nor have they reduced the brittle nature of candles, especially thin candles or tapers.

According to the present invention, a rigid wick, taper, or candle stiffening core is provided wherein either a centrally located conventional or stem wick is provided, surrounded by a consumable layer adapted to be consumed as the candle normally burns, providing necessary capillary action for normal consumption of the fuel body and of the consumable layer with a minimum of residue, while maintaining the wick or taper rigid durring normal burning.

The support layer or outer layer, whether meltable or not must have a higher melting temperature than the fuel body so that the fuel body wax may be melted to burn and supply the flame the heat of which then may consume the support layer.

Where a taper is used, its outer layer provides its own support. Where a taper is used in conjunction with a candle, then the rigidity of the taper is imparted to the candle.

As has been well known, in the past many efforts have been made to provide stiffening to a candle or candle wick. While stiffening has been provided in the past, such stiffening usually provided unpleasant residues and difficulty in controlling flames. What is more, actual rigidity for the burning device was generally not provided since wicks had only been adapted to a stiffness to protect them against falling over, as in the case of votive candles.

In my United States application, Ser. No. 389,397, various rigidizing means have been provided, such means functioning in conjunction with a rigid consumable core adapted to burn a minimum of undesirable residue.

The present invention provides a core rigidizing structure either as a taper or component of a candle where the rigidizing is provided by a stiffening layer, and when appropriate, the stiffening layer may be provided with perforations or pores to allow a fuel flow to the wick.

Although such novel feature or features believed to be characteristic of the invention are pointed out in the claims, the invention and the manner in which it may be carried out, may be further understood by reference to the description following and the accompanying drawings.

FIG. 7 is a candle including a wick of the present invention.

FIG. 8a is an enlarged, partly cut away view of the wick of FIG. 8.

FIGS. 8b, c, d, e, f and h are various perforations and openings in the outer layer of the wick of FIG. 7.

FIG. 8g is a stiff consumable plastic providing rigidity and porosity to the wick of FIG. 7.

FIGS. 9a–f are selections of various top views and a side view of wick shapes of the present invention.

FIG. 10 is an enlarged section view of another wick of the present invention.

FIG. 11 is a front elevation of a wick of FIG. 8 including integral threads in the outer layer.

Figure 3:
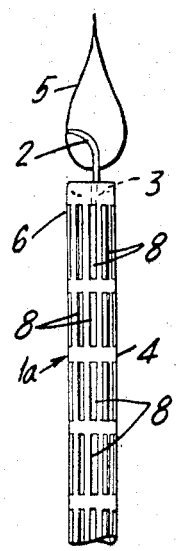
FIG. 3 is a perforated core of the present invention.

FIGS. 12a–j are front elevations of variant embodiments of the taper of FIG. 3.

FIGS. 13a–g are plan view sections of variant shapes of the taper of FIGS. 3, 12 and 14.

Figure 2:
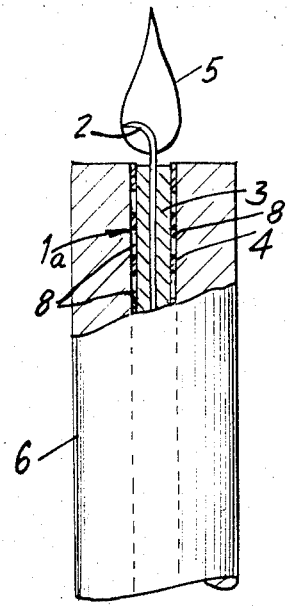
FIG. 2 is the core of a type such as illustrated in FIG. 3 in a section of a candle of larger diameter.

FIG. 14 is a cutaway section of a candle of the embodiment of FIG. 2 showing a partial section of a taper of FIGS. 3, 12 and 13.

FIG. 15 is a section of a votive candle including a taper of FIGS. 3, 12 and 13.

FIG. 16 is a cutaway section of the candles of FIGS. 2, 3 and 14 shown used with an adapter and a conventional candle holder.

FIG. 17 is a detail of the taper of FIG. 15 showing it on a support stand.

FIG. 18 is a cutaway front elevation of FIG. 17.

FIG. 19 is a detail of a taper of FIG. 14 in a support stand.

FIG. 20 is a cutaway front elevation of FIG. 19.

FIG. 21 is a front elevation of a taper of FIG. 13 including integral threads in the outer layer.

Referring now to the figures in greater detail, where like reference numbers denote like parts in the various figures.

Figure 1:
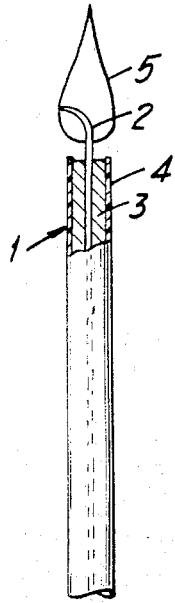
FIG. 1 is a partial section of a taper of the present invention.

The taper 1 as shown in FIG. 1 comprises a wick 2 which may be of conventional cloth wicking material, a fuel body 3, usually of wax and an outer layer 4 of a consumable substance such as nitrocellulose, cellulose acetate, plastic, thin wood or some hard burnable material.

The outer layer 4 firmly holds the fuel body 3, generally of wax. In burning, the flame 5 usually extends to the outer layer 4 and consumes its outer surface evenly as it burns down. The fuel body 3 is usually consumed first, lowering its level so that the normal burning is usually dripless.

The outer layer 4 for maximum effectiveness in general, and in order to maintain dripless burning of the taper 1, should comprise a material having a high melting point and/or temperature of ignition than the fuel body 3 so that the layer 4 does not melt or drip away before the fuel from the fuel body is first at least partly consumed.

It is further important that no matter what the composition of the outer layer 4 that it further be resistive to capillarity so that the layer itself does no act as a wick and may be burned, generally completely, as the receding burnt fuel body 3 and burning of the wick 2 expose the upper edge of the layer 4 to the action of the flame 5.

In such manner the layer 4 contributes rigidity to the taper 1, recedes with the burning of a taper, yet does not appreciably affect the burning characteristics of the taper 1.

While cellulosic materials are convenient in forming the coating that forms the layer 4, almost any substance that can surround the fuel body 3 and be reached by the flame 5 may suffice.

As will be hereinafter discussed, layers may even be formed of paper such as glassine or wood or fabric, if properly treated, to avoid or restrict the drawing of fuel into the layer 4, causing it to act as a wick as distinguished from a rigidizing layer. The layer 4 is best completely consumable by the flame 5 for neat burning.

The taper 1a as shown in FIG. 3 is designed to serve as a rigidizing core primarily, as distinguished from a taper 1. The perforations 8 permit an evening out of the melted fuel as the candle 6 burns, usually avoiding a build-up of the outer layer 4 of the taper 1a or an uneven burning of the candle 6.

The layer 4 provides a surprisingly rigid taper 1a which, when used in the center of a candle body 6, as shown in FIG. 2, provides a rigidity to the entire candle 6.

Figure 5:
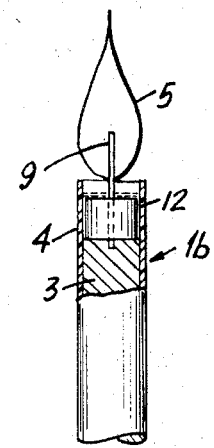
FIG. 5 is a partly cut away core or taper of the present invention including a weighted stem wick.
Figure 4:
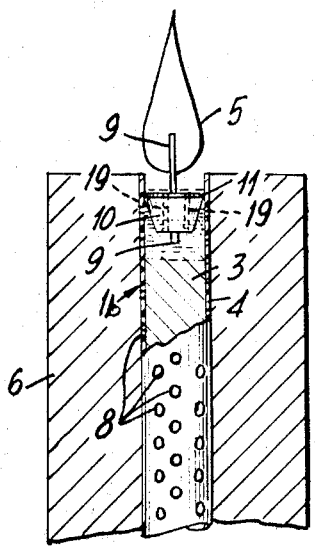
FIG. 4 is a partly cut away candle with a core or taper of the present invention, including a floating stem wick.

While a conventional wick 2 extended the length of the candle 6 may be used, the present invention is adapted to function in conjunction with a stem wick 9 as shown in FIGS. 4 and 5. The stem wick 9 may be of conventional braid or may be of asbestos or other fibre, consumable or not, that can maintain capillarity for drawing up the fuel to be consumed.

It is preferable for the stem wick to be erect and to remain erect whether or not it is consumable. It is well known in the candle art that conventional wicks ought to curve to the side to complete the combustion of the wicking and to be able to discharge any unwanted residues. The stem wick 9 must not be consumed, if consumable, until the entire candle 6 is burned.

In FIG. 4 the stem wick 9 is provided with a float 10 which is adapted to float in the pool of fluid. The pool is generally caused by the heat of the flame 5 melting the wax. Where the wax or fuel used in the taper 1b is of a low melting point, in some instances, a stem wick 9 might sink into the pool and be snuffed out. In the embodiment of FIG. 4, it is usually advisable to have a non-consumable plate 11 to prevent the float from burning.

As shown in FIG. 4, the float 10 is provided with vents 19. The fuel may pass through the vents forming a small pool about the stem wick 9, cooling it so that the lower portion is not likely to burn or be prematurely consumed.

The taper 1b is provided with perforation 8. The heat of the burning of the taper 1b melts the wax of the candle 6. The melted wax enters the taper 1b as part of its fuel pool and may help to evenly reduce the candle 6. When sufficient fuel has been burned, the upper edge of the layer 4 is clearly burned away, lowering the taper 1b.

In FIG. 5 the stem wick 9 is provided with a weight 12. In this instance, the weight 12 makes the stem wick 9 descend as the taper is burned and the outer layer 4 is consumed.

The taper 1b of FIG. 5 may burn outside a candle 6 as the taper 1 and burn without dripping.

In the past, efforts have been made to rigidize wicks by way of impregnation of the wicking cloth fiber. While some success had been obtained, such wicks of the past have not provided clean smooth burning candle consumption and rigidity.

A further problem has been the melting away of the rigidizing substance fouling the wick or dirtying the candle or forming a crust on the wick or even maintaining the wick against bending so that the wick end is not properly consumed. The flame may be extinguished or the flame size may not be controlled or controllable as in conventional candles.

Were the wick end not to be carbonized and consumed, the area of capillarity might continue to grow, increasing the flame size or unwanted residues might accumulate, causing difficulties with burning or causing smoke.

The candle 6 of FIG. 7 is provided with a wick 13 which comprises an outer layer 4a surrounding a fibrous wicking 2a. The wicking 2a may be in longitudinal strand form or conventional braid. The layer 4a may be of conventional cellulosic material such as is used to tip shoe laces or other consumable material.

In order for the wick 13 to burn perforations, openings or interstices 8a, b, c, d, e are provided. Different cross sections of the wicking and outer layer are shown in FIGS. 9a-f.

The wick 13 when coated with the outer layer 4a of easily burnable material such as non-porous cellulosic materials, including cellophane and cellulose acetate has a stiffness providing a genuine rigidity to the wick 13 and to the candle 6 as shown in FIG. 7. While in the past cellulosic spines have been located centrally within the centers of wicks, they have failed to provide a rigidity to a wick sufficient to render a candle rigid or they have burned, causing residue buildup.

In the conventional wick or conventional wick center the flame carbonizes the end of the wick which usually curls to reach the outer edge of the flame. The wicking tip is thus consumed and the flame size maintained relatively uniform.

While impregnated fibres have been used in the past in an attempt to provide rigidity to wicks, such efforts have not provided adequate rigidity or adequate residue-free burning. The outer layer 4b as shown in FIG. 8g is a rigid plastic, woven or molded to provide rigidity to the wick 13 and to further provide porosity by its interstices. Its success is contributed to by virtue of the fact that it is not fibre impregnated, and as such, is evenly burned without residue. The burnable rigidizing agent used must of course be sufficiently stiff to provide the desired rigidity.

The perforations 8a or interstices permit the burning away of the layer 4a to form a conventional wick while the fuel from the candle 6 enters the fibre 2a, keeping the flame 5 alive. The wick 13 may bend and be consumed and yet be truly rigid.

The layer 4a in FIG. 8h provides a single slit 8f for the entry of the candle 6 fuel. The staggering of the perforation as shown in FIGS. 8b, d and f is just an expedient to have a more even burning of the layer 4a with less surface of the layer to be burned.

Figure 6:
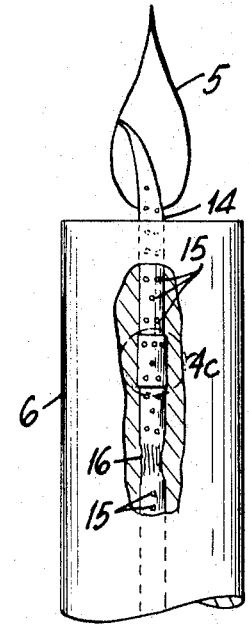
FIG. 6 is an enlarged section of a candle including a wick of the present invention.

The wick 14 as shown in FIG. 6 is a rigid wood, woody or wood-like stick provided with perforation 15. The wick 14 is made of bamboo, basswood or almost any wood which can provide rigidity to a candle and necessary capillary action for smooth burning.

While the porosity is illustrated by perforation 15, the same effect may be achieved by superficial crushing 16. The crushed area 16 must not destroy the central rigidity of the wick 14.

As can be seen in FIG. 6, the perforation 15 may be in patterns or voids provided to produce various flame effects. Areas along the wick 14 void of perforations may actually serve to self extinguish the flame 5.

While crushing 16 or perforations 15 may serve as the means of enabling a wick 14 to function for proper candle burning, a perforated layer 4c may be provided over a perforated, crushed or uncrushed wick 14 as shown in the detail 4c.

The diameter, shape and characteristics of the wick 14 must be selected by one skilled in the art so that the selected wood for the wooden wick 14, once crushed or perforated, permits a capillary action of the melted wax, either in the crushed area 16 of the wick 14 or through the perforation 15 and the body of the wick itself to provide a sustained flame 5. The diameter and shape of the wick 14 are preferably selected by one skilled in the art so that the wick 14 may twist in burning to reach the outer edge of the flame 5 and be completely consumed.

In FIG. 10 a hollow wick 17 is shown in section. The fibre wicking 18 is surrounded by an outer burnable plastic layer 4d which contains perforations 8f. While the wicking 18 may adhere to the outer layer 4d, it is not impregnated with material of the burnable layer 4d, thus allowing proper candle burning.

It should be noted that the wick 17 may have its outer layer applied by dipping or in some fluid form. In such cases, it is essential that the fibre 18 does not become impregnated with the material of the layer 4d, else it could not burn properly. There would not be a proper capillarity in the fibre 18 for normal burning. It is advisable, though, to have the fibre 18 adhere to the layer 4d even if there is some superficial impregnation.

Where the wick 17 is filled with longitudinal strands or squeezed together without a visible hollow center, the effect of the wick 17 is then similar to the wick as illustrated in FIG. 8.

For various adaptations of usage, an infinite number of wick shapes may be provided as shown in plan view of wicks in FIGS. 9a-f. FIG. 11 is a front elevation of a spiral configuration of wick.

In all embodiments the wick and flames have been provided with burning means to completely consume (where the wick is consumable) the wick and the rigidizing substance (where an additional layer is provided for rigidity).

In all of the embodiments of the present invention, capillarity is maintained for the proper consumption of fuel and flame size. The flame edge as shown in FIGS. 1–7, 14 and 15, burns away the rigidizing layer in a manner similar to the carbonization of the wicking.

In FIG. 7 the rigidizing layer is burned away from the wicking as the flame descends and the wick bends for its normal carbonization and consumption.

The wooden wick of FIG. 6 may be of a selection of shapes but best results are obtained by use of a shape which naturally curls or curves with burning so that the wick end reaches the flame edge and is consumed, limiting the flame size to a desired length as with a cloth wick.

Adjustment of the perforations may be used to create desired effects and flame sizes as desired.

In FIGS. 12a-f and 13a-h, assorted forms of tapers 1a are shown in detail with assorted perforation 8 or interstice pattern and taper shapes.

In FIG. 12 the various patterns of interstices 8 may create some forms of different burning effects. When the perforation 8 or interstices are in a staggered relationship, there is usually never a full unbroken rim of the outer layer 4 to burn down before new flow of melted fuel from the candle 6 can enter the taper 1a and reach the wicn 2.

In FIGS. 12d, 13g and 13h the rigidizing layer 4 is composed of rigidizing vertical stringers 20 which may be joined to form the taper 1 by threads 21. Where the stringers 20 are of plastic, such plastic must have the proper burning characteristics as hereinbefore set forth with regard to the various outer layers 4.

Where such stringers are of wood or a woody substance such as bamboo or basswood, it may be necessary that they be finished or treated so that they do not absorb the fuel 3 of the taper 1a or the candle 6 so as to change the burning characteristics of the taper. A plastic coating on wood may serve this purpose and prevent fuel absorption by the stringers 20.

The threads 21 as shown in FIG. 12d may be burnable plastic or even treated fibre to render them generally non-absorbant to the fuel so that they burn away rather than absorb fuel and burn as a wick which would change the burning characteristic of the taper 1a and/or the candle 6.

In FIG. 13h the stringers do not normally have to be treated where they are of wood. They may be laminated between thin layers of plastic or cellophane with the perforation between the stringer 20 so that no fuel reaches the stringers, only the flame 5 reaching them to burn them down.

The layer 4 of FIG. 12g may be a coated thread, such as cotton rendered stiff and non-absorbent to the fuel.

The layer 4 of FIG. 12f may be of woven plastic having the burning characteristics as hereinbefore set forth, or even of coated thread of sufficient stiffness to provide rigidity to the taper 1a and non-absorption characteristics.

In all instances, it should be understood that while the components of the tapers and wicks and the wicks themselves may be resilient their overall effect is to give strength to a candle 6 and make the candle 6 rigid and overcome the wax brittleness of candles of the prior art.

A taper 1, 1a for instance, having a layer 4 of glassine paper or cellophane when surrounding a fuel body 3, has a surprising rigidity such as may be exemplified by wrapping such substance tightly about a finger. In such case it is difficult or impossible to bend the finger within, or bend the entire wrapped finger and layer.

The wick 13 may require some degree of greater strength of its layer 4a, 4b adjustable to its requisites, yet this layer 4a, 4b wrapped tightly over the fibre 2a while likely resistant, provides rigidity to a candle 6 when it is integral of such candle.

Adaptations of the present invention to the needs of the situation as to degree of rigidity, sizes and shapes of interstices or perforations are a matter of selection with relation to select use by one skilled in the art, taking into account such factors as rigidity for votive candle wicks, regular candle and taper diameters and selected waxes and their burning temperature.

The taper 1a of FIG. 21 is provided with an external threaded layer 22 for use in certain applications of the taper as a support or for its support, among other things.

The candle 6 as shown in FIG. 14 includes a taper 1a. For driplessness, the candle 6 is provided with an outer layer 23 of hard wax having a higher melting point than the wax of the body of the candle 6. This is a conventional expedient. In burning, the inner wax melts first and forms a pool 24 which feeds into the taper 1a and to the wick 2, tending to evenly burn the candle 6 from the inside, driplessly. FIG. 14 is a more detailed depiction of the invention of FIG. 2.

The candle 6 of FIG. 14 may have its taper 1a mounted in a stand 25. Such stands are known in the art, though they have not heretofore been combined with candles 6 and tapers 1a as herein disclosed.

In FIG. 15, a taper 1a is shown as used in a votive candle 26. In this use a stand 27 is important and the rigidity of the taper is put to practical use. Most votive candles need some form of stand to support the wick or taper 1a as in this case shown so that the flame is not extinguished by the unsupported wick toppling into the wax pool 24.

Conventional stands could be used as with stiffened wicks of the prior art to support the wick 12 of the present invention in a votive candle.

In FIGS. 14, 19 and 20 details of the application of the taper 1a with the stand 25 are shown.

In FIGS. 15, 17 and 18 the taper 1a is adapted in a novel manner using outer layer 4 as a support means to interfit the stand 27.

In FIG. 16 a candle 6 of the present invention is shown in a new and novel configuration in conjunction with an extension of the taper 1a used with an adapter 28 to support the candle in a conventional candle holder 29, the taper 1a being independent of the adapter 28 or integral thereto. The adapter 28 and candle 6 may be separated by a fireproof plate 30, where desired.

The terms and expressions which are employed are used as terms of description; it is recognized, though, that various modifications are possible within the scope of the invention claimed.

Having thus described certain forms of the invention in some detail, what is claimed is:

1. A rigid support for use in a candle, said support comprising, an inner portion including wick means adapted to sustain a flame and a surrounding outer portion having at least one opening therethrough to allow the passage of melted wax, said outer portion independently flammable, resistive to absorption of melted wax and having a temperature of ignition in excess of the melting temperature of candle wax, said wick adapted to be in contact with said melted wax wherein the flame on said wick ignites said outer portion to combustion.

2. The invention of claim 1 wherein said wick is adapted to be consumed by a flame.

3. The invention of claim 1 wherein said wick has a temperature in burning in excess of the melting temperature of candle wax.

4. The invention of claim 1 wherein said wick is adapted to maintain capillary action within said melted wax.

5. The invention of claim 1 wherein said wick is substantially non-consumable.

6. The invention of claim 1 wherein said wick is adapted to curl in burning to reach the edge of the flame.

7. The invention of claim 6 wherein said wick is made of wood, said wood having means to sustain capillarity.

8. The invention of claim 6 wherein said wick is made of bamboo, said bamboo having means to sustain capillarity.

9. The invention of claim 1 wherein said wick and said outer portion are separated by a body of wax.

10. The invention of claim 9 including a float said float carrying said wick, said wick being substantially non-consumable, said float adapted to fit within the periphery of said outer portion.

11. The invention of claim 10 wherein said float includes at least one opening therethrough to allow the passage of melted wax to said non-consumable wick.

12. The invention of claim 9 wherein said wick is non-consumable, said wick including a weight adapted to fit within the periphery of said outer portion and descends as said candle is consumed.

13. The invention of claim 1 wherein said wick is in intimate contact with said outer portion.

14. The invention of claim 13 wherein said wick is a hollow layer of fiber.

15. The invention of claim 1 wherein said outer portion opening is a longitudinal slit.

16. The invention of claim 1 wherein said outer portion is a woven surface.

17. The invention of claim 9 wherein said outer portion comprises spaced apart longitudinal strips stitched in spaced relationship.

18. The invention of claim 9 wherein said outer portion is woven.

19. The invention of claim 9 wherein said outer portion comprises a lamination of longitudinal spaced apart wooden strips, said lamination including an outer layer covering said strips.

20. The invention of claim 9 wherein said outer portion comprises a lamination of longitudinal spaced apart bamboo strips, said lamination including an outer layer covering said strips.

21. The invention of claim 7 wherein said outer portion is juxtaposed to said wick, the outer surface of said wick being resistant to absorption of melted wax.

22. A rigid taper, said rigid taper comprising supporting means, said supporting means including an inner portion including a wick adapted to sustain a flame and an outer portion, said outer portion independently flammable, said outer portion resistive to the absorption of melted wax, said outer portion having a temperature of ignition in excess of the melting temperature of candle wax, said wick adapated to be in contact with said melted wax, said wick and outer portion separated by a body of wax wherein the flame on said wick ignites said outer portion to combustion.

23. The taper of claim 22 wherein said wick is substantially non-consumable.

24. The taper of claim 23 wherein said non-consumable wick includes a weight adapted to fit within the periphery of said outer portion and descend as said taper is consumed by said flame, said wick extending a short distance into said body of wax.

25. The taper of claim 23 including a float adapted to fit within the periphery of said outer portion and descend as said taper is consumed by said flame, said wick extending a short distance into said body of wax.

References Cited
UNITED STATES PATENTS

| | | | |
|---|---|---|---|
| 808,698 | 1/1906 | Spies | 67—22 |
| 1,174,934 | 3/1916 | Hawkins | 67—21 |
| 1,462,601 | 7/1923 | Hohmann | 67—22 |
| 2,001,377 | 5/1935 | Candy | 67—22 |
| 2,208,279 | 7/1940 | Powers | 67—22 X |
| 2,818,718 | 1/1958 | Roberts | 67—22 |

CHARLES J. MYHRE, *Primary Examiner.*